United States Patent [19]

Ausnit

[11] 4,249,982
[45] Feb. 10, 1981

[54] APPARATUS FOR MAKING RECLOSABLE BAGS

[75] Inventor: Steven Ausnit, New York, N.Y.

[73] Assignee: Minigrip, Inc., Orangeburg, N.Y.

[21] Appl. No.: 101,780

[22] Filed: Dec. 10, 1979

Related U.S. Application Data

[60] Division of Ser. No. 919,823, Jun. 28, 1978, which is a continuation-in-part of Ser. No. 813,450, Jul. 7, 1977.

[51] Int. Cl.³ ............................................. B32B 31/00
[52] U.S. Cl. ....................................... 156/461; 156/66;
156/204; 156/290; 156/244.15; 156/500
[58] Field of Search .......................... 156/66, 200–204,
156/461, 226, 227, 198, 290, 459, 244.15, 500;
24/201 C; 229/62; 150/3

[56] References Cited

U.S. PATENT DOCUMENTS

| | | | |
|---|---|---|---|
| 3,746,215 | 7/1973 | Ausnit et al. | 150/3 UX |
| 3,780,781 | 12/1973 | Uramoto | 150/3 |
| 3,839,128 | 10/1974 | Arai | 156/66 X |
| 4,191,230 | 3/1980 | Ausnit | 229/62 X |

Primary Examiner—David A. Simmons
Attorney, Agent, or Firm—Hill, Van Santen, Steadman, Chiara & Simpson

[57] ABSTRACT

Apparatus for making an integral extruded plastic bag, comprising means for forming a thin wall extruded flexible plastic web, and integrally on the plastic web longitudinally extending and laterally spaced complementary resiliently flexible interlocking fastener profiles having an imperforate gusset-forming web area therebetween, means for collapsably folding the gusset-forming web area into a gusset extending in one direction away from said profiles, means for folding portions of the plastic web into free terminal digitally manipulatable double thickness bag mouth pull flanges projecting to a suitable length in the opposite direction from said profiles, means for collapsing the remainder of the plastic web into bag side wall panels toward said gusset and to extend to a substantially greater length than the gusset for providing a substantial bag pouch into which the gusset projects only a limited distance, and means for securing the fastener profiles together into interlocking but releasable fastener relation.

8 Claims, 9 Drawing Figures

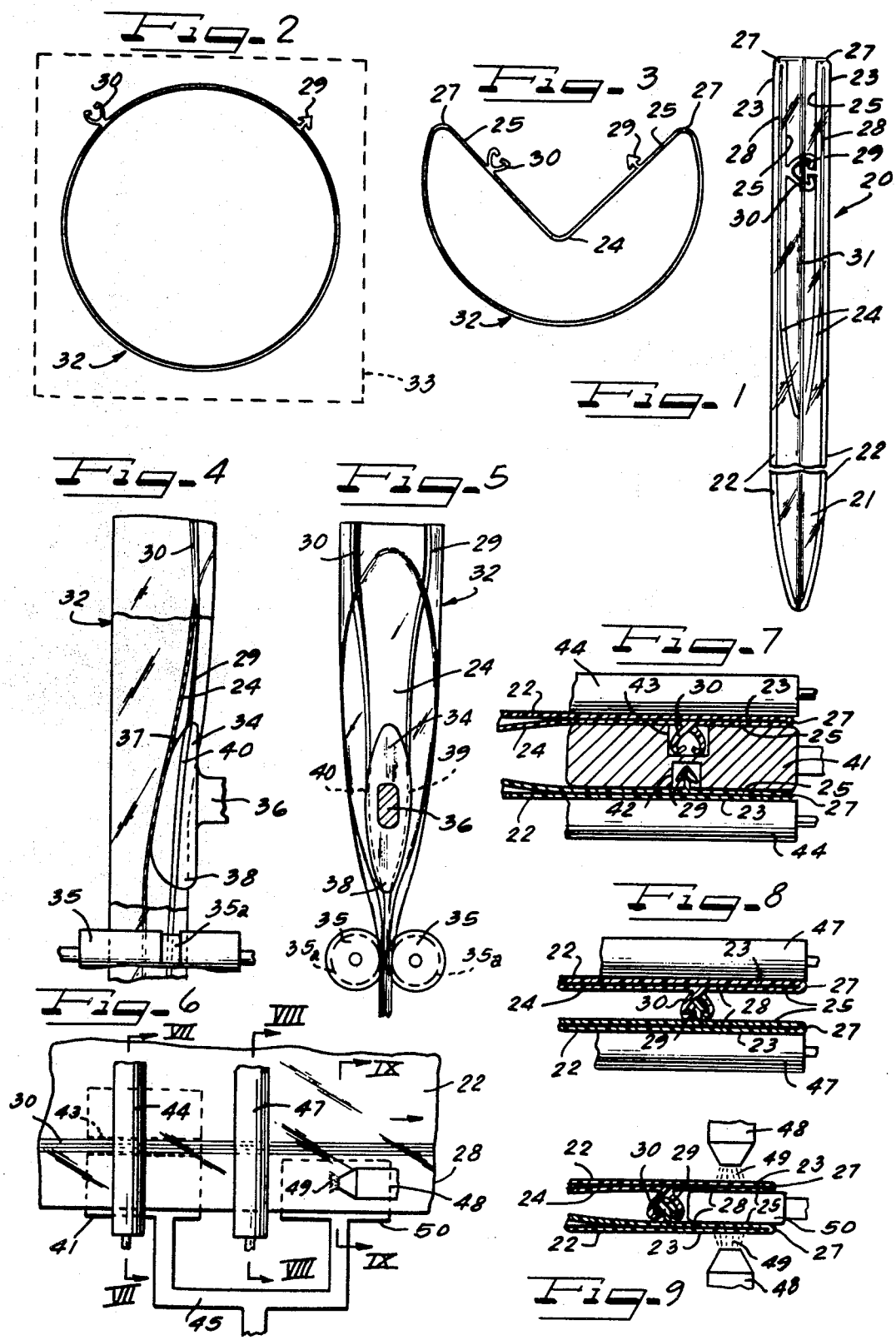

4,249,982

APPARATUS FOR MAKING RECLOSABLE BAGS

RELATED APPLICATIONS

This application is a division of my copending application Ser. No. 919,823, filed June 28, 1978 and a continuation-in-part of my copending application Ser. No. 813,450, filed July 7, 1977.

BACKGROUND OF THE INVENTION

This invention relates to improvements in apparatus for making reclosable bags, and is more particularly concerned with apparatus especially suitable for making reclosable bags from one piece integral extrusions, and which are adapted to be initially hermetically sealed and after being opened are reclosable by means of integral separable fasteners.

A wide variety of products from foodstuffs to hardware and materials in liquid or granular form are desirably packaged in flexible plastic bags which may or may not be transparent or at least translucent. With certain types of packaged contents, it is desirable to provide means preventing unauthorized access to the contents or to prevent spillage. Often the contents must remain hermetically sealed until used. With pourable contents, whether liquid or particulate, it is often desirable to have the bags equipped with pouring spout means. A type of bag which is especially suitable for these purposes is disclosed in U.S. Pat. No. 3,746,215. However, the bags disclosed therein are constructed from a plurality of separately formed parts secured together. That complicates and increases cost of manufacture because of the multi-part fabrication and the necessary assembling and securing together of the parts.

A principal aim of the present invention is to provide a new and improved, simplified, efficient apparatus by which the bags can be produced in one integral extruded piece. Tubular extrusions for manufacture of bags are disclosed, for example, in U.S. Pats. Nos. 3,246,672, Re. 29,208, and 3,380,481. Although those patents disclose the integral extrusion of separable zipper-type resiliently flexible fasteners, they fail to have any provision for a combination closure and hermetic sealing gusset means which may, if desired also provide pouring spout means.

SUMMARY OF THE INVENTION

It is, accordingly, an important object of the present invention to provide a new and improved apparatus for making integral extruded construction for reclosable bags in which by means of a single one piece extrusion not only the bag pouch body and separable fastener means are provided but also an integral infolded hermetic sealing gusset which gusset may also serve as a pouring spout after the bag is opened.

Another object of the invention is to provide a new and improved apparatus for making integral extruded bag construction which contains in one integral part all of the elements needed for a complete specialized bag structure.

Still another object of the invention is to provide a new and improved apparatus for making special type reclosable bags.

Yet another object of the invention is to provide a new and improved apparatus for making one piece extruded plastic reclosable bags.

In a preferred embodiment of the invention, there is provided apparatus for making an integral extruded plastic bag, comprising means for forming a thin wall extruded flexible plastic web, and integrally on the plastic web longitudinally extending and laterally spaced complementary resiliently flexible interlocking fastener profiles having an imperforate gusset-forming web area therebetween, means for collapsably folding the gusset-forming web area into a gusset extending in one direction away from said profiles, means for folding portions of the plastic web into free terminal digitally manipulatable double thickness bag mouth pull flanges projecting to a suitable length in the opposite direction from said profiles, means for collapsing the remainder of the plastic web into bag side wall panels toward said gusset and to extend to a substantially greater length than the gusset for providing a substantial bag pouch into which the gusset projects only a limited distance, and means for securing the fastener profiles together into interlocking but releasable fastener relation. In the bag thus formed, the gusset provides a secure closure for the bag which closure is adapted to be broken for discharging contents from the bag, and the separable fastener profiles being then adapted for reclosing the bag.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

BRIEF DESCRIPTION OF THE DRAWINGS

FIG. 1 is a fragmentary vertical end elevational view of an extruded one-piece plastic bag embodying features of the present invention.

FIG. 2 is a schematic illustration of a method of and means for extruding an integral extruded construction or section for bags according to the invention and in this instance comprising a tubular extrusion.

FIG. 3 demonstrates the extrusion of FIG. 2 partially folded.

FIGS. 4 and 5 are schematic illustrations of one method of and means for effecting folding of the extrusion.

FIG. 6 is a fragmentary schematic top plan view of another part of apparatus for making bags according to the present invention.

FIG. 7 is a fragmentary sectional detail view taken substantially along the line VII—VII of FIG. 6.

FIG. 8 is a fragmentary sectional detail view taken substantially along the line VIII—VIII of FIG. 6; and FIG. 9 is a fragmentary sectional detail view taken substantially along the line IX—IX of FIG. 6.

DESCRIPTION OF PREFERRED EMBODIMENTS

On reference to FIG. 1, one form of one piece extruded plastic bag 20 adapted to be made by means of the apparatus of this invention is depicted comprising a pouch body 21 having coextensive opposite side wall panels 22. Integrally connected with upper mouth end portions 23 of the side wall panels 22 is an inturned security closure gusset 24 having upper end portions 25 which are integrally joined with the upper mouth end portions 23 of the side wall panels along integral fold junctures 27. The gusset wall portions 25 and the side panel portions 23 are of adequate width to provide double thickness flanges 28 at each side of the mouth of the bag and adapted for manipulation to open the bag mouth when desired.

Formed integrally with the bag extrusion, and in this instance integrally on the confronting surfaces of the walls of the gusset 24 at the lower sides of the flange portions 25 are separable fastener means comprising complementary resilient zipper-type fastener profiles comprising a male profile 29 on one side and a female profile 30 on the other side. The profiles 29 and 30 are of any desired form, in this instance comprising a generally arrow-head shaped form for the male profile 29 having opposite lateral shoulders, therealong, and a complementary undercut side hook groove recessed form for the female profile 30. Thereby the profiles are adapted to interengage in a locking relation by pushing them together and are adapted to be separated by pulling laterally apart on the manipulatable mouth end pull flanges 28.

As shown, the gusset 24 extends as a generally infolded extension into the bag body 21 extending from the mouth end of the bag and provides an initial closure which may be a hermetic security seal and which is adapted to be punctured or otherwise opened when desired to gain access to contents sealed within the pouch of the bag. In this instance, the gusset 24 is of a length to serve as a pouring spout funnel by reversion of the gusset when the fastener 29, 30 is open, for discharge of contents from the bag.

Filling of the bag 20 may be effected in any desired manner, either by inserting contents from one side of the bag before such one side is sealed closed, or by having the lower end of the bag initially open, or slit open for filling the bag from the bottom and then sealing the bottom end of the bag to provide a fully closed bag enclosing the contents. It will be understood that by having the plastic material of the bag of a heat sealable thermoplastic type, as is customary, bags can be produced in continuous succession from a continuous extrusion. Although in the finished bag 20 the laminar wall areas 23 and 25 will be held reasonably close together by the thermally sealed bag side edge seams 31, assurance of laminar integrity may be attained by thermally securing the areas 23 and 25 together to form the flanges 28.

As represented in FIG. 2, an integral extrusion construction 32 for making a succession of the bags 20 is adapted to be formed by extrusion of suitable thermoplastic material, utilizing any preferred extrusion process and equipment, which may conveniently be substantially according to that disclosed in U.S. Pat. No. Re. 29,208, the disclosure of which is embodied herein by reference to any extent necessary. According to that patent, extrudate is forced from an extruder, schematically identified at 33 through a suitable annular or other geometric form of die opening to provide a thin wall extruded flexible plastic web which, as shown, may be tubular but may also be formed with symmetrically disposed unjoined edges in a flat sheet or strip or other geometric shape wherein the thin wall film or web character of the extruded product is adapted for producing bags 20 in whatever size desired. Where the extruded construction 32 is tubular as shown, the inside of the extruded tube is pressurized by means of air to keep it from collapsing and to obtain cross grain orientation of the material as the extruded shape is cooled and set for further handling. Formed integrally on the extruded web 32 are the longitudinally extending and suitably laterally spaced complementary resiliently flexible fastener profiles 29 and 30. As shown in FIG. 2, the profiles 29 and 30 are integrally attached in one piece to the outer face of the extruded web structure 32. In this instance the spacing between the profiles 29 and 30 is about one-fourth of the circumference of the tubular web 32.

After the extruded construction 32 has been cooled and set sufficiently to be easily handled, the gusset 24 is folded in and the fastener profiles 29, 30 closed. By way of example, about one-third of the perimeter of the tubular construction 32 with the profiles 29 and 30 located symmetrically thereon may be folded inwardly as shown in FIG. 3. As will be observed the folding in is started at the fold points 27 sufficiently spaced from respectively the profiles 29 and 30 so that as folding in of the gusset 24 and collapsing of the remainder of the tubular section 32 progresses, the flange areas 25 at the outer sides of the gusset and the corresponding flange areas 23 of the bag side wall panels 22 will be automatically brought into contiguity.

One means for effecting tucking in of the gusset 24 and collapsing of the tubular construction 32 is depicted schematically in FIGS. 4 and 5. For this purpose, a gusset tucking-in head member 34 is located adjacently upstream relative to cooperating rotary pinch rolls 35 to effect progressive folding tucking in of the gusset 24 as the pinch rolls collapse and advance the bag-making one piece extruded web structure and fastener profiles 29, 30. In keeping with its tucking-in function, the member 34 is fixedly supported by means of an arm 36 or the like extending from suitable frame structure (not shown) and has a suitable formed shape including a smoothly contoured tucking in edge 37. At its forward end the member 34 tapers to a relatively thin tip 38 consistent with the folded, collapsed condition of the bag section into which the tubular extrusion 32 is forced, by and between the nips of the pinch rolls 35. Along its opposite sides the tucking member 34 has respective longitudinally extending guide grooves 39 and 40 through which the profiles 29 and 30, respectively run during the tucking-in and collapsing operation. These guide grooves 39 and 40 assure that the fastener profiles 29 and 30 will remain in proper spaced opposed relation as the gusset 24 is being tucked in and after the substantially collapsed extrusion section leaves the tucking-in member 34 and passes on and through the pinch rolls 35 which have relief grooves 35a to clear the profiles.

After leaving the pinch rolls 35, the collapsed, tucked-in plastic section travels on through additional processing means depicted in FIGS. 6–9, desirably comprising a joining guide block 41 which is received within the tucked in gusset 24 and which has a guide groove 42 on one side through which the fastener profile 29 runs and a guide groove 43 parallel thereto on the opposite side through which the fastener profile 30 runs in the onward travel of the collapsed continuous plastic bag making section. The opposite sides of the guide member 41 are flat and parallel and guide rolls 44 maintain the laminar collapsed bag wall panels 22 and 23 and gusset walls 24 and 25 running in a laminar relation along the flat faces of the guide block member. Support for the guide block member 41 may be provided by means of a supporting frame bracket 45 mounted on the machine frame (not shown).

Downstream adjacent to the guide block 41, cooperating rotary joining rolls 47 press the laminar fastener profile carrying portions of the collapsed extruded section toward one another and snap the fastener profiles 29 and 30 into interlocking relation as viewed in FIG. 8, while maintaining the laminar structure in substantially parallel relation.

Adjacently downstream from the guide rolls 47 means are provided for heat sealing the laminar pull flange areas 23 and 25 together. In a desirable form such heat sealing means comprise hot air nozzles 48 which are directed to impinge hot air jet streams 49 against the outer areas 23 to soften and substantially fuse the areas 23 to the areas 25. The hot air may be supplied from any suitable source. Means which may also be supported by the bracket 45 and comprising an anvil block 50 is disposed between the on-running pull flanges 28 as they are being impinged by the hot air jet streams 49. Not only are the flanges 28 thereby held in proper, efficient, position to receive the hot jet streams 49 thereagainst, but by having the anvil 50 located between said flanges, the flanges are prevented from being sealed together. Also, by having the anvil 50, if desired of a good heat transfer material such as aluminum or the like, residual heat in the anvil derived from the jet streams acting on the flanges 28 will preheat the inner flange areas 25 to speed up the fusing action. In effecting the fusing, there need be only sufficient softening at the interface between the flange areas 23 and 25 to effect a reasonable bond so as to maintain the fused laminar relation of the flange areas from spreading open when the bags made from the extruded collapsed process section are filled. Beyond the fusing device 48, 50, the completed collapsed extruded plastic bag making section is adapted to be further process as by transversely sealing and dividing the same into bag sections, filling the bag sections, and sealing either the side opening or bottom opening, as the case may be, after the bag sections have been filled.

It will be understood that variations and modifications may be effected without departing from the spirit and scope of the novel concepts of this invention.

I claim as my invention:

1. Apparatus for making an integral extruded plastic bag, comprising:

means for forming a thin wall extruded flexible plastic web, and integrally on the plastic web longitudinally extending and laterally spaced complementary resiliently flexible interlocking fastener profiles having an imperforate gusset-forming web area therebetween;

means for collapsably folding the gusset-forming web area into a gusset extending in one direction away from said profiles;

means for folding portions of the plastic web into free terminal digitally manipulatable double thickness bag mouth pull flanges projecting to a suitable length in the opposite direction from said profiles;

means for collapsing the remainder of the plastic web into bag side wall panels toward said gusset and to extend to a substantially greater length than the gusset for providing a substantial bag pouch into which the gusset projects only a limited distance;

and means for securing the fastener profiles together into interlocking but releasable fastener relation;

whereby the gusset provides a secure closure for the bag which closure is adapted to be broken for discharging contents from the bag, and the separable fastener profiles being then adapted for reclosing the bag.

2. Apparatus according to claim 1, wherein said means for collapsing said side wall panels comprise rotary rolls through the nips of which the collapsed web is caused to travel.

3. Apparatus according to claim 2, wherein said means for infolding comprise a contoured member having guide grooves through which the fastener profiles run in guided relation.

4. Apparatus according to claim 3, comprising means downstream from said rotary rolls and grooved infolding member and comprising a spacer member extending into the gusset and having guide grooves through which the profiles run, and squeeze rolls for substantially flattening the double thickness flanges toward the spacer member.

5. Apparatus according to claim 4, comprising rotary joining rolls downstream from said squeeze rolls and providing said means for effecting separable fastening interengagement of the fastener profiles.

6. Apparatus according to claim 5, including means downstream from the joining rolls for bonding said double thickness flanges into substantially unitary flange structure.

7. Apparatus according to claim 1, including means for bonding said double thickness flanges into substantially unitary structure.

8. Apparatus according to claim 7, wherein said bonding means comprise a contact heating element for heating said pull flanges at their inner sides, and hot air applying means for heating the pull flanges at their outer sides.

* * * * *